United States Patent [19]
Arscott

[11] Patent Number: 4,730,852
[45] Date of Patent: Mar. 15, 1988

[54] VEHICLE EXHAUST REPAIR DEVICE

[76] Inventor: Christopher Arscott, 550 Oak Park Drive, London, Ontario, Canada, N6H 3N7

[21] Appl. No.: 925,521

[22] Filed: Oct. 28, 1986

Related U.S. Application Data

[63] Continuation of Ser. No. 623,563, Jun. 22, 1984, abandoned.

[30] Foreign Application Priority Data

Mar. 2, 1984 [CA] Canada .................................. 448696

[51] Int. Cl.$^4$ ............................................. F16L 23/00
[52] U.S. Cl. ..................................... 285/15; 285/412; 285/415
[58] Field of Search ................. 285/15, 368, 414, 412, 285/415; 248/65; 181/243; 422/168

[56] References Cited

U.S. PATENT DOCUMENTS

| | | | |
|---|---|---|---|
| 2,841,348 | 11/1953 | Stahlhuth | 248/65 |
| 2,842,218 | 7/1958 | Bradbury | 248/62 |
| 2,992,035 | 7/1961 | Tell et al. | 248/65 |
| 3,199,815 | 8/1965 | Martinkoviz et al. | 248/62 |
| 3,515,416 | 6/1970 | Pickert | 285/368 |
| 3,704,995 | 12/1972 | Hetherington | 285/412 |
| 3,999,784 | 12/1976 | Kennedy, Jr. | 248/65 |
| 4,277,092 | 7/1981 | Viers | 285/368 |
| 4,397,486 | 8/1983 | Ohya | 285/368 |
| 4,519,639 | 5/1985 | Florian | 285/412 |
| 4,547,344 | 10/1985 | Divilio et al. | 285/415 |
| 4,643,458 | 2/1987 | Ammar | 285/412 |

FOREIGN PATENT DOCUMENTS 1368945  10/1974  United Kingdom ................ 285/368

OTHER PUBLICATIONS

*Muffler Digest*, Mar. 1983, p. 61.

Primary Examiner—Randolph A. Reese
Assistant Examiner—Anthony Knight
Attorney, Agent, or Firm—Cushman, Darby & Cushman

[57] ABSTRACT

The invention is a device for repairing a defective exhaust system of a vehicle. Some types of catalytic converters have an integral collar to hold the converter to the vehicle. Failure of the collar due to corrosion and other factors results in the converter being only partially supported by the vehicle and may also result in a poor connection with the rest of the exhaust system. The device of the invention acts both to vertically support the converter of the vehicle and to secure the converter to the rest of the exhaust system.

3 Claims, 5 Drawing Figures

VEHICLE EXHAUST REPAIR DEVICE

This is a continuation of application Ser. No. 623,563, filed June 22, 1984, which was abandoned upon the filing hereof.

This invention relates to a device for repairing a defective exhaust system of a vehicle, and in particular, relates to a device which may be used to repair a failed collar which acts both to vertically support a catalytic converter on the vehicle and to connect the converter to a downstream exhaust pipe.

All recent models of passenger vehicles have some means for controlling the emission of pollutants in the exhaust gases. One type of mechanism for controlling emission gases is a catalytic converter which is installed in the exhaust system such that gases leaving the engine of the vehicle must pass therethrough prior to being expelled. A catalytic converter is a device having electrostatically-charged grids which attract particles in the gases. The catalytic converter of interest to the subject invention is hung below the frame of the vehicle with its forward end connected through a pipe to the exhaust manifold of the vehicle and its rearward end connected to the rest of the exhaust system and supported by an integral collar from the frame of the vehicle. The subject invention is concerned with a device and method for repairing a failure of the rearward support collar of the converter.

The relevance of the subject invention is further explained by the presence slightly downstream of the integral collar of a joint connecting the downstream end of the catalytic converter with the upstream end of an exhaust pipe on the vehicle. In that type of exhaust arrangement to which the subject invention is directed the mating surfaces of the joint are held together by a collar which is secured to the integral collar on the converter. If the collar on the converter erodes, that collar may lose its integrity with the remainder of the converter which may also result in a disengagement or loosening of the mating surfaces between the parts of the joint immediately downstream of the converter.

The subject invention is a device and method for supporting the rearward end of a catalytic converter on which the integral collar has eroded or otherwise failed, and the subject invention also provides support to a joint which is downstream of the catalytic converter and which is supported by the failed collar.

In one form, the subject invention is a device for holding together the abutting ends of two axially-aligned pipe sections and supporting those abutting ends from a support collar. The one pipe section has one fixed protrusion means extending therefrom and the other pipe section has another fixed protrusion means extending therefrom. The device of the subject invention comprises a first collar adapted to be mounted on the one pipe section so as to engage the one protrusion means, a second collar adapted to be mounted on the other pipe section so as to engage the other protrusion means, and fastener means adapted to extend between the first and second collars to secure those collars together and to hold those collars to the support collar. The engagement of the first collar with the one protrusion means prevents axial motion of that collar past that protrusion means, and the engagement of the second collar with the other protrusion means prevents axial motion of the second collar past the other protrusion means.

The one protrusion means may act as part of an abutment means on the abutting end of the one pipe section, and the other protrusion means may act as part of an abutment means on the abutting end of the other pipe section. The fastener means may comprise a first fastener device adapted to extend between the first and second collars to secure those collars together and a second fastener device adapted to hold those collars to the support collar. The fastener means may alternately comprise a single fastener device that is both adapted to extend between the first and second collars to secure those collars together and to also hold those collars to the support collar. The other protrusion means may comprise the remnants of a support collar welded to the other pipe section, that support collar being formerly connected to the support collar. The one pipe section may be a section of the exhaust pipe of a vehicle and the other pipe section may be an end portion of a catalytic converter installed on that vehicle, and the support collar may be connected to the vehicle.

In another form, the device of the subject invention is a device for use in repairing an exhaust support system of a vehicle which system originally comprises a first collar removably mounted on a first pipe section so as to engage a protrusion means on the first pipe section, a second collar fixedly mounted to a second pipe section axially-aligned with and abutting the first pipe section, and fastener means securing the first collar to the second collar and securing both collars to a support collar. The exhaust support system requires repair when a portion of the second collar fixedly mounted to the second pipe section becomes detached from a portion of the second collar to which the fastener means is secured. The repair device comprises a repair collar adapted to be removably mounted on the second pipe section so as to engage a protrusion means on the second pipe section, and repair fastener means adapted to secure the first collar to the repair collar and to secure both collars to the support collar.

The protrusion means on the second pipe section may be that portion of the second collar fixedly mounted to the second pipe section. The protrusion means on the second pipe section may alternately be the flared end on that pipe section adapted to abut a complementary end of the first pipe section. The protrusion means on the first pipe section may be the complementary end on that pipe section. The repair collar may have a generally U-shaped profile allowing mounting of the repair collar laterally over the second pipe section such that the two legs of the repair collar extend on diametrically-opposite sides of the second pipe section. In this arangement, the repair fastener means comprises a pair of bolts, each bolt being connectable to a respective one of the legs of the repair collar such that the bolts extend along diametrically-opposite sides of the second pipe section, each bolt being also connected to the first collar. The inner surface of the repair collar may have a groove extending therein adapted to receive the portion of the second collar fixedly mounted to the second pipe section, the repair collar being thereby constrained when mounted on the second pipe section from movement axially thereon. The second pipe section may be the downstream end of a catalytic converter for the vehicle, the first pipe section may be a portion of the exhaust pipe of a vehicle and the support bracket may be secured to a vehicle.

In a further form, the invention is a method of repairing an exhaust support system of a vehicle where that system originally comprises a first collar removably mounted on a first pipe section so as to engage a protrusion means on the first pipe section, a second collar fixedly mounted to a second pipe section axially-aligned with and abutting the first pipe section, and fastener means securing the first collar to the second collar and securing both collars to a support collar. The exhaust support system requires repair when a portion of the second collar fixedly mounted to the second pipe section becomes detached from a portion of the second collar to which the fastener means is secured. The repair method comprises the steps of, firstly, removing the fastener means and that portion of the second collar to which the fastener means extends from the exhaust support system, secondly, positioning a repair collar on the second pipe section so as to engage a protrusion means on the second pipe section, and thirdly, securing the first and repair collars together and to the support collar by means of repair fastener means.

In another form, the invention is a method for holding together the abutting ends of two axially-aligned pipe sections and supporting those abutting ends from a support collar, the one pipe section having one fixed protrusion means extending therefrom and the other pipe section having another fixed protrusion means extending therefrom. The method comprises the steps of, firstly, mounting a first collar on the one pipe section such that the first collar engages the one protrusion means, that engagement preventing axial motion of the first collar past the one protrusion means on the one pipe section. The method secondly comprises the step of mounting a second collar on the other pipe section such that the second collar engages the other protrusion means, that engagement preventing axial motion of the second collar past the other protrusion means on the other pipe section. The method comprises the third step of mounting fastener means such that fastener means extend between the first and second collars to secure those collars together and to hold those collars to the support collar.

The invention will next be more fully described by means of a preferred embodiment utilizing the accompanying drawings, in which.

Figure 1:
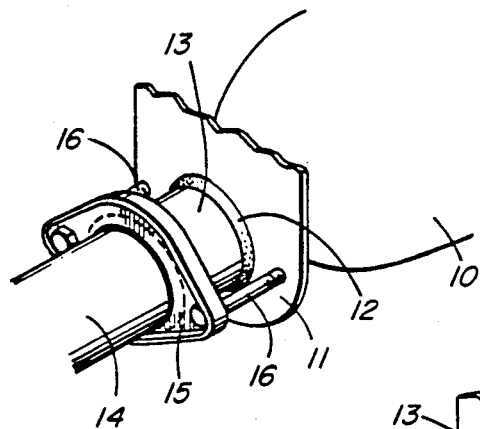
FIG. 1 is a perspective view of the downstream end of a catalytic converter prior to failure of the collar supporting that end of the converter from the frame of the vehicle.

A catalytic converter, generally designated as 10 in the drawings, is supported at its rearward end from the underside of a vehicle by a collar 11 which is welded along seam 12 to a section of pipe 13 integrally secured to the catalytic converter 10. The body of catalytic converter 10 and the short pipe section 13 which is integrally connected to that body are formed from stainless steel, and weld seam 12 can only be applied by specialized machinery at the plant where the catalytic converter units are made. The collar 11 is not formed from stainless steel and is subject to corrosion.

Figure 3:
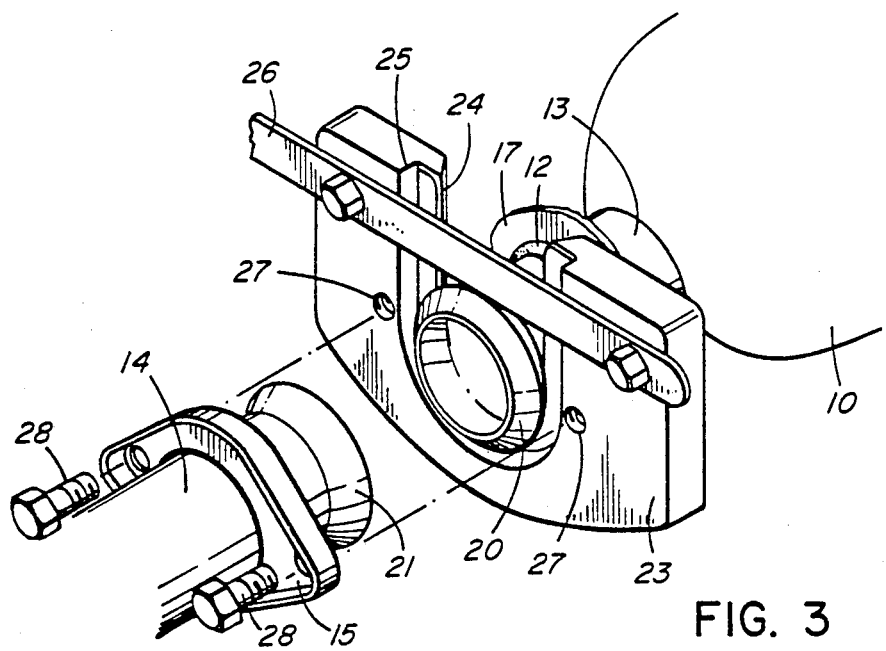
FIG. 3 is a perspective view of a first form of a repair collar of the subject invention shown in situ.

The pipe section 13 connects to a section 14 of the exhaust pipe at a joint located slightly downstream from the position of bracket 11; that joint can be more clearly seen in FIG. 3. The abutting ends of pipe sections 13 and 14 are held in mating relationship by a collar 15 which is axially slidable on pipe section 14, which collar 15 is secured by a pair of bolts 16 to collar 11.

Figure 2:
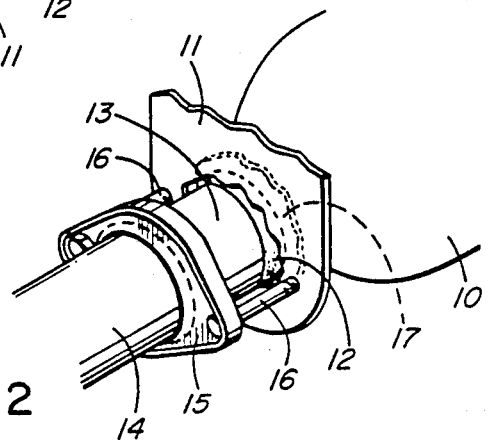
FIG. 2 is a perspective view of the downstream end of a catalytic converter similar to FIG. 1, but illustrating a failed support collar on that end of the converter.

The difficulty with the previously-described construction occurs when collar 11 corrodes such that it no longer holds the pipe section 13 connected to catalytic converter 10 securely to the frame of the vehicle. For instance, as shown in FIG. 2, the corrosion of collar 11 may result in the pipe section 13 being axially movable through collar 11; without pipe section 13 being maintained stable relative to collar 11, collar 15 is not able to maintain a mating relationship between the abutting ends of pipe sections 13 and 14. This is generally illustrated in FIG. 2, where collar 11 has corroded around seam 12 such that collar 11 is free to move toward the joint between pipe sections 13 and 14. Such movement results in the tension being removed from the pair of bolts 16 and, as mentioned, a resultant loosening of the mating relationship between pipe sections 13 and 14.

FIG. 3 illustrates a first embodiment of the repair device of the subject invention. The pair of bolts have been removed from collar 11, and that collar itself has been removed from the underside of the vehicle. A small remnant 17 of collar 11 still remains connected to pipe section 13 by seam 12. The embodiment of the subject invention illustrated in FIG. 3 is especially-adapted for use with pipe sections having abutting ends configured as in FIG. 3. Specifically, it is adapted for catalytic converters that have on the downstream end of pipe section 13 a steeply-flared male coupling element 20 as shown in FIG. 3. In respect of catalytic converters having this type of male coupling element on their downstream end, a first embodiment of the subject invention is utilized; that embodiment is the U-shaped collar 23 shown in FIG. 3. On the inner edge of collar 23 a shoulder 24 is sized such that the distance between its pair of parallel edges is just slightly greater than the diameter of pipe section 13. A recess 25 extends proximate of shoulder 24 in collar 23 and is sufficiently large that the male coupling element 20 can be positioned therein, as shown in FIG. 3. The collar 23 is secured to a support bracket 26 that extends laterally across the underside of the vehicle. Support bracket 26 may be the same means by which collar 11 was connected to the underside of the vehicle.

A pair of holes 27 in collar 23 are threaded to receive a pair of bolts 28, the bolts 28 being of shorter length than the bolts 16 originally utilized. The pair of bolts 28 are placed through the pair of holes in collar 15 and screwed into the pair of holes 27 in collar 23 to hold the complementary coupling elements 20 and 21 together in a tight mating relationship. It can thus be seen that the collar 23 when used in association with the original collar 15 on the exhaust pipe of the vehicle both acts to support the downstream end of the catalytic converter and tightly connect the catalytic converter to the downstream side of the exhaust system.

Figure 4:
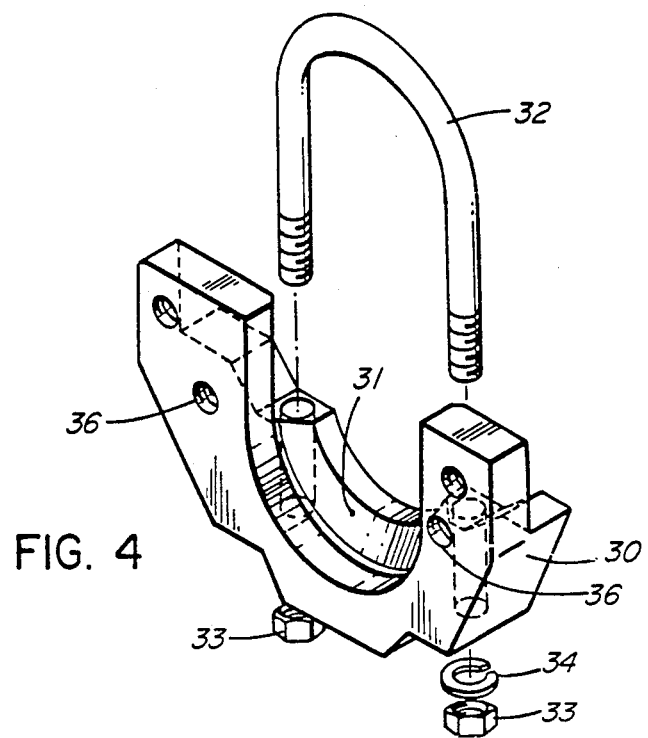
FIG. 4 is a perspective view of a second form of a repair collar of the subject invention.
Figure 5:
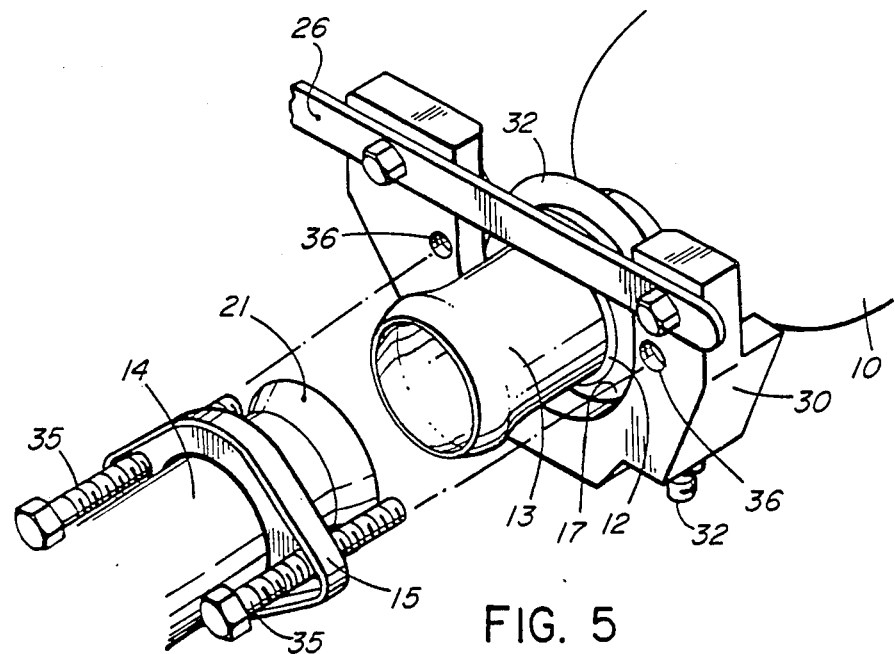
FIG. 5 is a perspective view of a second form of a repair collar of the subject invention, shown in situ.

FIGS. 4 and 5 represent a second embodiment of the subject invention, which embodiment is utilized when the male coupling element on pipe section 13 has a reduced or negligible profile and it is awkward or impossible to prevent a collar such as collar 23 from sliding over the end of pipe section 13. This situation is illustrated in FIG. 5. FIG. 4 illustrates a collar 30 which is utilized in the second embodiment. The collar 30 is placed over the remnant 17 of bracket 11 after remnant 17 has been ground to have a generally circular contour. An arcuate groove 31 in collar 30 is adapted to receive the ground remnant 17 of bracket 11. A U-bolt 32 having a pair of nuts 33 and a pair of locking washers 34 on its ends is adapted to hold collar 30 against pipe section 13, the positioning of remnant 17 of bracket 11 in groove 31 preventing movement of collar 30 along pipe section 13. In this embodiment, the collar 15 on exhaust pipe section 14 is also utilized, but a pair of bolts 35 are utilized which are longer than the pair of bolts 28 utilized in the embodiment of FIG. 3. A pair of holes 36 in collar 30 are adapted to receive the pair of bolts 35. As with the other embodiment, in this embodiment the collar 30 in association with collar 15 and support bracket 26 is adapted to support the downstream end of catalytic converter 10 and also provide a tight mating relationship between the pair of pipe sections 13 and 14.

Since it is very difficult and expensive to weld a new collar 11 or any similar collar onto stainless steel pipe section 13, the repair device of the subject invention has found great utility both in inexpensively and quickly providing vertical support for the downstream end of catalytic converters and in tightly holding that downstream end against the adjoining exhaust pipe section, both types of support being required after collar 11 has failed from corrosion or other causes.

I claim:

1. A repair bracket assembly for use in mounting a catalytic converter to an exhaust pipe along the underside of a vehicle after corrosive failure of an original bracket welded to a pipe extending from the downstream side of the catalytic converter, that converter pipe having a downstream end connecting to the upstream end of an exhaust pipe, the connection being by means of a bulbous end on the converter pipe and a mating cupped end on the exhaust pipe, the converter pipe and exhaust pipe being held together prior to the corrosive failure by a collar and a fastener means, the collar extending around the exhaust pipe so as to abut the exterior of the cupped end, and the fastener means connecting the collar to the original bracket, the corrosive failure of the original bracket allowing movement between a first portion of that original bracket welded to the converter pipe and a second portion to which the fastener means connects, the repair bracket assembly comprising a U-shaped block having two generally parallel arms and a surface facing said collar, the inner edge of the U-shaped block being shaped to define a recess in the surface of the block facing the collar, and inwardly extending shoulders at the inner edges of said arms, said recess being adapted to receive a complementary external enlargement on the converter pipe, and also comprising a U-bolt adapted to fasten to the block such that the converter pipe is tightly held between the block and the U-bolt, the distance between the inner edges of the shoulders of the two arms being slightly greater than the diameter of the converter pipe so as to prevent said converter pipe from moving axially with respect to the block in a direction away from the exhaust pipe, the block having means for securely holding the fastener means extending from the collar, whereby after corrosive failure of the original bracket, repair is accomplished by fastening the repair bracket assembly to the converter pipe by fastening the U-bolt to the block so as to tightly hold that pipe and securing the collar to the repair bracket assembly using the fastener means or using new similar fastener means;

said means for securely holding the fastener means comprising respective internally threaded openings formed in said two arms of said U-shaped block of said repair bracket, these openings being oriented to open towards said collar so that the fastener means which extend from said collar may be threaded into said repair bracket for pulling said collar against the cupped end on the exhaust pipe while pulling said repair bracket against the bulbous end on the converter pipe.

2. The repair bracket assembly of claim 1, wherein:
said U-shaped block further includes a surface facing said catalytic converter, and said recess comprises an arcuate groove formed in said block between said surface facing said collar and said surface facing said catalytic converter, this groove being adapted to laterally receive a complementary portion of said first portion of said original bracket for restricting axial movement of said converter pipe relative to said block.

3. The repair bracket assembly of claim 2, further comprising:
a fastener alignment and securement means provided on ends of said two arms of said block, these alignment and securement means being adapted for securement to a suspension hanger for connecting said repair bracket to the underside of the vehicle.

* * * * *